3,405,033
SPACER FOR FUEL ASSEMBLIES
Björn Widell, Vasteras, Aart Van Santen, Hokasen, and Constan Glandin, Vasteras, Sweden, assignors to Allmänna Svenska Elektriska Aktiebolaget, Vasteras, Sweden, a corporation of Sweden
Filed July 1, 1966, Ser. No. 562,223
Claims priority, application Sweden, July 2, 1965, 8,759/65
10 Claims. (Cl. 176—78)

ABSTRACT OF THE DISCLOSURE

A nuclear fuel assembly having spacers comprising an outer frame surrounding two rigid grids in spaced relationship to each other and elongate resilient spacer springs supported by and extending between the two grids. Each grid comprises a plurality of polygonal meshes and each elongate spring has opposite ends fixed to the grids at the corners of the meshes.

The present invention relates to spacers for the fuel assemblies of a nuclear reactor, comprising a spacer body and spacer springs supported by this body to form fuel rod positioners.

In order to ensure that the fuel rods are held fast in a fuel assembly it has previously been suggested to design the spacers so that they consist of a rigid spacer body forming a stable unit and supporting a number of spring elements abutting the fuel rods. Spacers so designed provide exact and reliable positioning of the separate fuel rods and also offer considerable advantages from the mounting point of view.

The present invention relates to a further development of this already proposed type of spacer. The purpose of the invention is to effect a spacer which is simple and cheap to manufacture, requires little material and offers the least possible resistance for the reactor coolant flowing around the fuel rods. The invention is characterised in that the spacer body consists of an outer frame and two essentially parallel grids attached to the frame, between which the spacer springs are arranged. This arrangement of the spacer means that the spacer is very light, but in spite of this, is stable and reliable. The spacer springs are suitably designed so that the grids remain substantially unaffected by stresses in a direction at right angles to the grids. The two grids thus receive a certain support from the spacer springs, at the same time providing attachment points for these. For a spacer body of the above mentioned type the spacer springs are most suitably shaped so that they are constituted by strip-shaped spring members running substantially at right angles to the grid planes and being provided at the centre part with convex parts or abutting bodies facing the fuel rod positions of the grids and projecting substantially parallel to the grids. The grids may be composed of closed profiles joined together, for example, by means of welding or soldering, but the grids can also be produced by placing laths crossing each other over the outer frame of the spacer body.

The invention is especially suitable for manufacturing grids and spacer springs in one piece by punching them from a flat metal sheet. The abutting convex parts of the spacer springs are obtained by bending the punched flat metal sheet, preferably in a rounded angle at the centre and afterwards bending it in the opposite direction on both sides of the first mentioned bend. Finally the metal sheet is bent at right angles to the first bends to form a closed profile and these closed profiles are finally joined so that in this way the two grids are formed.

Figure 1:
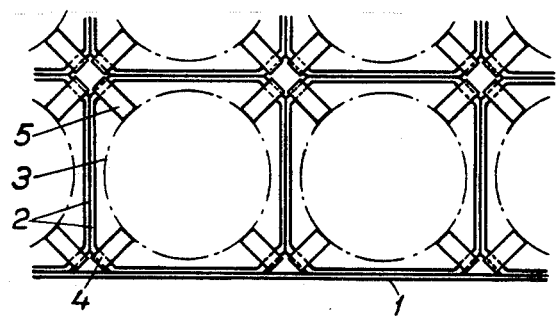
Figure 2:
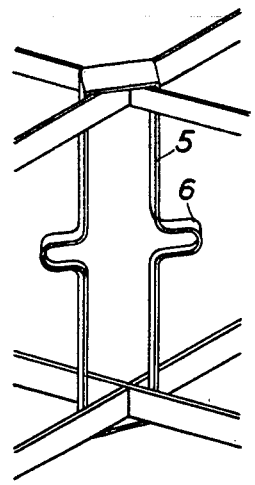
Figure 3:
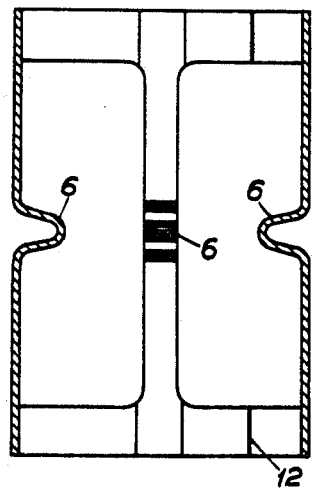
Figure 4:
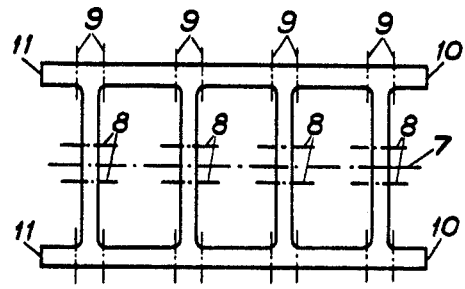

In the following the invention will be more fully described with reference to the accompany figures. FIGURE 1 shows an axial projection of one part of a spacer according to the invention. FIGURE 2 shows a perspective sketch of a slightly different embodiment of the invention. FIGURE 3 shows a diagonal section through a fuel rod positioner. FIGURE 4 shows a punched metal for a fuel rod positioner according to FIGURE 3.

In the figures 1 designates the outer frame of the spacer and 2 the inner intermediate walls which form the fuel rod positioners in the spacer. In the spacer according to FIGURE 1 the intermediate walls 2 are formed by a number of separate closed profiles having basically square form, each of which will enclose a fuel rod 3 indicated in the figure. The closed profiles are rigidly connected to each other, preferably welded together, and the square basic form is modified at the corners with a bevel 4 to provide attachment or starting point for the spacer springs 5. The intermediate walls 2 form a grid and the spacer according to the invention comprises two such grids placed at a distance from each other in the axial direction of the fuel rods and both attached to the common outer frame 1. Each fuel rod positioner thus comprises two closed profiles under each other and four spacer springs 5 placed between them. The spacer springs in the shown embodiment comprise separate elements which are bent over the corner bevels of the fuel rod positions and possibly secured with the help of welding or soldering.

To reduce the weight of the spacer the sides of the essentially square closed profile are ground so that the wall thickness in the sides is less than in the corner bevels 4. The corners require greater thickness since they support the spacer springs 5.

In FIGURE 2 is shown an embodiment where the intermediate walls 2 consist of laths crossing each other and supported by the outer frame 1, not shown in FIGURE 2. The laths are provided with slots so that they can cross each other in the same plane at the point of intersection. In the embodiment according to FIGURE 2 the spacer springs 5 comprise strip-shaped spring members placed diagonally across the intersection points of the intermediate walls 2. The spring strips 5 may with advantage be combined to form closed units when mounting. About in the middle between the upper and the lower grids the spacer springs are provided with convex parts 6 which provide abutting bodies for the fuel rods. The convex parts 6 may possibly be replaced by rigid abutting bodies. The springs 5 are dimensioned suitably so that normally no forces acting at right angles to the grid occur. In the figures only one diagonally placed spring strip is shown. In a complete spacer a second spring strip is also arranged at right angles to that shown.

FIGURE 3 shows a fuel rod position in diagonal section, that is the section is taken axially and diagonally across the substantially square fuel rod positioner. Contrary to what is the case in the embodiment according to FIGURE 1, the spacer springs in the embodiment according to FIGURE 3 are produced in one piece with the fuel rod positioner. The manufacture of such a fuel rod positioner is carried by starting from a flat metal sheet and punching out a piece shaped as shown in FIGURE 4. The flat metal detail is then bent in a preferably rounded bend along the centre line 7 in FIGURE 4. After that two bends are made in the opposite direction on each side of the first bend as indicated by the dotted lines 8 in FIGURE 4. The metal member is then bent to a closed, substantially square fuel rod positioner with bevelled corners, which is effected by bending along the dotted lines 9. When this last bending has been carried out then ends 10 and 11 touching each other are joined together by welding, whereby the joint 12 shown in FIGURE 3 is obtained. The fuel rod positioners so produced

We claim:
1. A nuclear fuel assembly including a plurality of elongate fuel elements supported in a bundle, spacing means for spacing the fuel elements from each other, said spacing means comprising a rigid spacer body and elongate resilient spacer springs, said body having an outer frame and two essentially parallel grids attached to said frame in spaced relationship to each other, each of said grids comprising a plurality of polygonal meshes and each of said elongate spacer springs being supported by and extending between said two grids and having opposite ends fixed to said two grids at the corners of said meshes.

2. A nuclear fuel assembly as claimed in claim 1 wherein said spacer springs are substantially free from tensions affecting said grids in a direction at right angles to said grids.

3. A nuclear fuel assembly as claimed in claim 1 wherein said spacer springs comprise strip-shaped spring members running substantially at right angles to said grids and have between said grids convex parts facing said fuel rods and projecting substantially parallel to said grids.

4. A nuclear fuel assembly as claimed in claim 1 wherein said grids consist of a plurality of polygonal ring-formed members rigidly attached to each other.

5. A nuclear fuel assembly as claimed in claim 4 wherein each of said polygonal ring-formed members from each of said two grids together with the respective spacer springs form a fuel rod location.

6. A nuclear fuel assembly as claimed in claim 5 wherein the two polygonal ring-formed members belonging to a certain fuel rod location and the spacer springs belonging to the same fuel rod location are made in one piece.

7. A nuclear fuel assembly as claimed in claim 4 wherein said polygonal ring-formed members have substantially square form with bevelled corners forming attachment points for said spacer springs.

8. A nuclear fuel assembly as claimed in claim 7 wherein said substantially square ring-formed members have greater wall thickness at said bevelled corners than between said corners.

9. A nuclear fuel assembly as claimed in claim 1 wherein said grids consist of groups of essentially parallel lath-shaped elements crossing each other.

10. A nuclear fuel assembly as claimed in claim 9 wherein said spacer springs form closed loops of strip material, said loops running diagonally across the intersection points of said lath-shaped elements forming the grid.

References Cited

UNITED STATES PATENTS

| | | | |
|---|---|---|---|
| 3,167,484 | 1/1965 | Beutel | 176—78 X |
| 3,228,854 | 1/1966 | Bekkering et al. | 176—78 |
| 3,255,090 | 6/1966 | Leirvik | 176—76 |
| 3,255,091 | 6/1966 | Frisch | 176—78 |
| 3,298,922 | 1/1967 | Prince et al. | 176—76 X |
| 3,301,764 | 1/1967 | Timbs et al. | 176—76 X |
| 3,301,765 | 1/1967 | Eyre et al. | 176—76 X |

CARL D. QUARFORTH, *Primary Examiner.*

M. J. SCOLNICK, *Assistant Examiner.*